US009975634B2

(12) United States Patent
Von Novak, III et al.

(10) Patent No.: US 9,975,634 B2
(45) Date of Patent: May 22, 2018

(54) MAGNETIC FIELD NAVIGATION OF UNMANNED AUTONOMOUS VEHICLES

(71) Applicant: QUALCOMM Incorporated, San Diego, CA (US)

(72) Inventors: William Henry Von Novak, III, San Diego, CA (US); Joseph Maalouf, San Diego, CA (US); Sumukh Shevde, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/202,796

(22) Filed: Jul. 6, 2016

(65) Prior Publication Data
US 2018/0009527 A1    Jan. 11, 2018

(51) Int. Cl.
*B64C 30/00*    (2006.01)
*B64C 39/02*    (2006.01)
(Continued)

(52) U.S. Cl.
CPC .......... *B64C 39/024* (2013.01); *G08G 5/003* (2013.01); *G08G 5/0069* (2013.01);
(Continued)

(58) Field of Classification Search
CPC ........... B64C 39/024; B64C 2201/141; G08G 5/003; G08G 5/0069; H04W 84/042; H04W 84/12
See application file for complete search history.

(56) References Cited

U.S. PATENT DOCUMENTS 7,318,564 B1 *   1/2008   Marshall ............. B60L 11/1822
                                                          191/10
7,398,946 B1 *   7/2008   Marshall ............. B60L 11/1816
                                                          191/10
(Continued)

FOREIGN PATENT DOCUMENTS

| EP | 2829937 A1 | 1/2015 |
|---|---|---|
| KR | 100664043 B1 | 1/2007 |
| KR | 20160015715 A | 2/2016 |

OTHER PUBLICATIONS

Schechter E., "Drone on a Wire: UAVs Could Perch on Power Lines to Recharge," Jun. 26, 2014, pp. 3.
(Continued)

*Primary Examiner* — Behrang Badii
*Assistant Examiner* — Daniel L Greene
(74) *Attorney, Agent, or Firm* — The Marbury Law Group, PLLC

(57) ABSTRACT

Embodiments include devices and methods for navigating an unmanned autonomous vehicle (UAV) based on a measured magnetic field vector and strength of a magnetic field emanated from a charging station. A processor of the UAV may navigate to the charging station using the magnetic field vector and strength. The processor may determine whether the UAV is substantially aligned with the charging station, and the processor may maneuver the UAV to approach the charging station using the magnetic field vector and strength in response to determining that the UAV is substantially aligned with the charging station. Maneuvering the UAV to approach the charging station using the magnetic field vector and strength may involve descending to a center of the charging station. The UAV may follow a specified route to and/or away from the charging station using the magnetic field vector and strength.

28 Claims, 7 Drawing Sheets

(51) Int. Cl.
*G08G 5/00* (2006.01)
*H04W 84/04* (2009.01)
*H04W 84/12* (2009.01)

(52) U.S. Cl.
CPC ..... *B64C 2201/141* (2013.01); *H04W 84/042* (2013.01); *H04W 84/12* (2013.01)

(56) References Cited

U.S. PATENT DOCUMENTS

| | | | | |
|---|---|---|---|---|
| 8,511,606 | B1* | 8/2013 | Lutke | B64C 39/028 244/100 R |
| 8,963,488 | B2 | 2/2015 | Campanella et al. | |
| 9,056,676 | B1* | 6/2015 | Wang | B64F 1/00 |
| 9,174,733 | B1* | 11/2015 | Burgess | B64D 1/12 |
| 2003/0105534 | A1* | 6/2003 | Hara | B25J 9/1682 700/2 |
| 2009/0045290 | A1 | 2/2009 | Small et al. | |
| 2009/0284245 | A1* | 11/2009 | Kirby | G06K 7/0008 323/318 |
| 2011/0312279 | A1* | 12/2011 | Tsai | G01S 11/02 455/67.11 |
| 2012/0016538 | A1* | 1/2012 | Waite | G01C 21/20 701/3 |
| 2015/0336669 | A1* | 11/2015 | Kantor | G01C 21/20 701/3 |
| 2016/0001883 | A1* | 1/2016 | Sanz | B64F 1/02 244/17.23 |
| 2016/0039300 | A1* | 2/2016 | Wang | B60L 11/1822 244/39 |
| 2016/0039541 | A1* | 2/2016 | Beardsley | B60L 11/1816 701/2 |
| 2016/0137311 | A1* | 5/2016 | Peverill | B64C 39/024 244/110 C |
| 2016/0243949 | A1* | 8/2016 | Merkel | H02J 7/025 |

OTHER PUBLICATIONS

International Search Report and Written Opinion—PCT/US2017/029100—ISA/EPO—Jun. 8, 2017.

* cited by examiner

MAGNETIC FIELD NAVIGATION OF UNMANNED AUTONOMOUS VEHICLES

BACKGROUND

The use of autonomous and semiautonomous unmanned autonomous vehicles (UAVs), also referred to as "drones," is becoming more common. The range of a UAV may be limited by its stored power supply. Recharging stations may extend the range of a UAV, and with proper placement of recharging stations, the range of a UAV may be effectively unlimited.

Wireless charging stations are well suited for this task, because the UAV does not need to be perfectly aligned with the wireless charging station in order to charge the power supply. Further, the charging station typically does not have exposed conductors that may become dirty or corroded by the elements.

However, reasonably good alignment between charging station and the receive coil on the drone (e.g., within a few centimeters to tens of centimeters) is required for the UAV to be able to utilize wireless power. While Global Positioning System (GPS), inertial navigation, radio navigation, and other fairly standard systems may enable a UAV to move within a few meters of a recharging station, these navigation systems are not sufficiently accurate to obtain the centimeter-level accuracy required to properly dock with a wireless charging station. While more accurate navigation systems exist, such as Differential Global Positioning System equipment, these systems are expensive, relatively heavy, and require increased calibration to achieve the improved location accuracy.

SUMMARY

Various embodiments include methods of navigating an unmanned aerial vehicle (UAV) that may include calculating a magnetic field vector and strength of a magnetic field emanating from a charging station, navigating the UAV to the charging station using the calculated magnetic field vector and strength, determining whether the UAV is substantially aligned with the charging station, and maneuvering the UAV to approach the charging station using the magnetic field vector and strength in response to determining that the UAV is substantially aligned with the charging station.

In some embodiments, determining whether the UAV is substantially aligned with the charging station may include determining whether the UAV is substantially aligned with a center of the charging station. Some embodiments may further include recalculating the magnetic field vector and strength in response to determining that the UAV is not substantially aligned with the center of the charging station, and maneuvering the UAV to approach the charging station using the recalculated magnetic field vector and strength.

In some embodiments, maneuvering the UAV to approach the charging station using the magnetic field vector and strength may include maintaining the UAV substantially above the charging station using the magnetic field vector and strength while descending to the charging station. In some embodiments, maneuvering the UAV to approach the charging station using the magnetic field vector and strength may include descending the UAV to the charging station while maintaining the UAV substantially above a center of the charging station using the magnetic field vector and strength.

Some embodiments may further include determining whether the UAV is sufficiently proximate to the charging station, and initiating charging of a power storage of the UAV in response to determining that the UAV is sufficiently proximate to the charging station.

Some embodiments may further include detecting the magnetic field, detecting one or more characteristics of the detected magnetic field, and verifying that the charging station is generating the magnetic field based on the detected one or more characteristics.

In some embodiments, navigating the UAV to the charging station using the calculated magnetic field vector and strength may include obtaining route information defining a specified route for approaching the charging station, and navigating the UAV along the specified route using the route information and the calculated magnetic field vector and strength.

Some embodiments may further include navigating the UAV away from the charging station using the magnetic field vector and strength. In such embodiments, navigating the UAV away from the charging station using the magnetic field vector and strength may include obtaining route information for a specified route away from the charging station, and navigating the UAV along the specified route away from the charging station using the route information and the calculated magnetic field vector and strength.

In some embodiments, calculating the magnetic field vector and strength of the magnetic field emanating from the charging station may include receiving information from a magnetic field sensor comprising a first coil, a second coil, and a third coil, wherein each coil is oriented orthogonally to the other two coils, and calculating the magnetic field vector based on the information received from the first coil, the second coil, and the third coil.

In some embodiments, calculating the magnetic field vector and strength of the magnetic field emanating from the charging station may include receiving information from a magnetic field sensor comprising a first coil, a second coil, and a third coil, wherein at least one of the first coil, the second coil, and the third coil may include a charging coil of the UAV, and calculating the magnetic field vector based on the information received from the first coil, the second coil, and the third coil.

In some embodiments, calculating the magnetic field vector and strength of the magnetic field emanating from the charging station may include receiving information from a magnetic field sensor comprising a first coil, a second coil, and a third coil, wherein the first coil, the second coil, and the third coil are oriented substantially in the same plane and wherein each coil is oriented to detect a first magnetic field component of a first plane and a second magnetic field component of one of a second plane and a third plane, and calculating the magnetic field vector based on the information received from the first coil, the second coil, and the third coil.

Further embodiments may include a UAV having a magnetic field sensor and a processor coupled the magnetic field sensor and configured with processor-executable instructions to perform operations of the methods summarized above. Further embodiments may include means for performing functions of the methods summarized above. Further embodiments may include a non-transitory processor-readable medium having stored thereon processor-executable instructions configured to cause a processor of a UAV to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
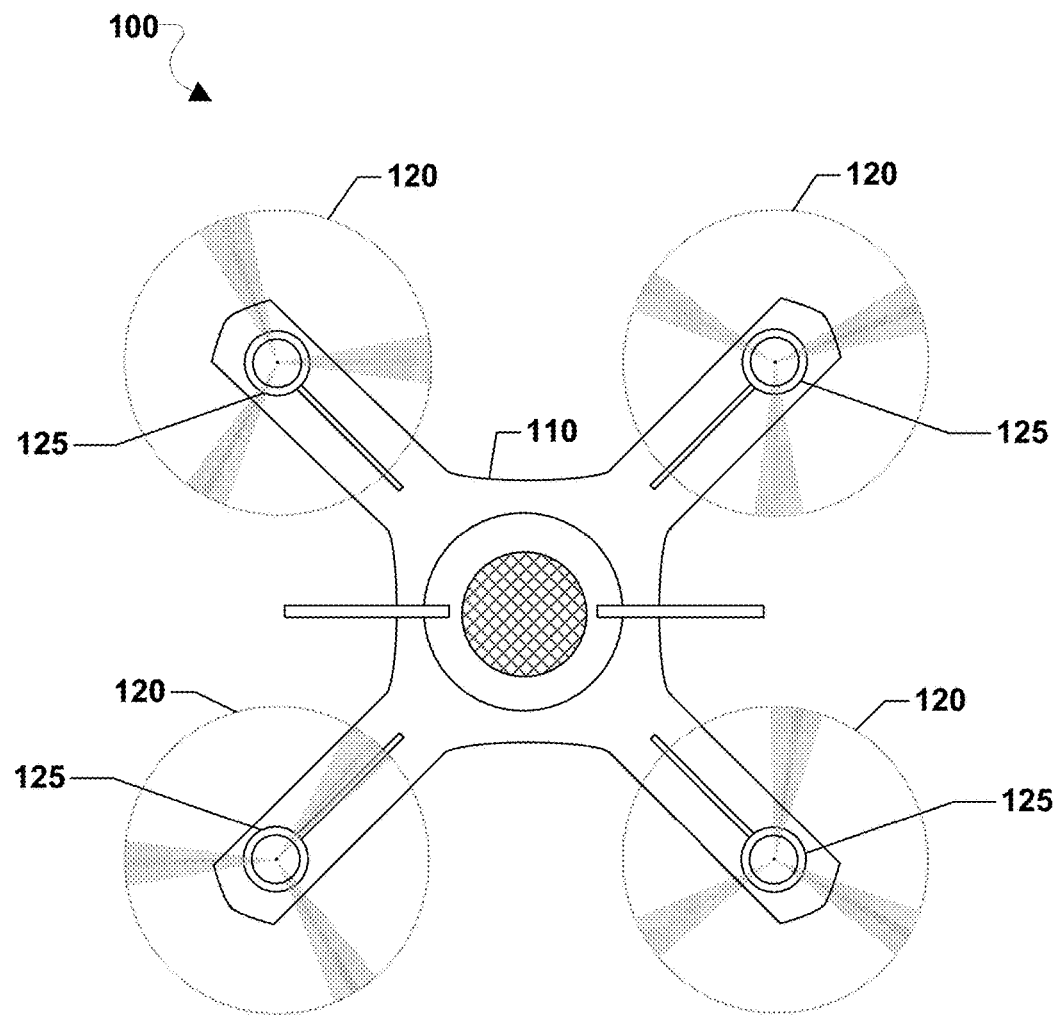
FIG. 1 is a top view of a UAV according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods for navigating a UAV to a wireless charging station to accurately position the UAV on the charging station. The various embodiments include sensing the magnetic field of the charging station and using the direction of magnetic field lines to guide the UAV to the center of the charging station. The various embodiments also include using the magnetic field of the charging station to accurately navigate the UAV away from the charging station after charging of the UAV.

As used herein, the term "UAV" refers to one of various types of unmanned autonomous vehicle. Any of a variety of vehicles may be configured to operate autonomously and work with the various embodiments, including aerial vehicles, land vehicles, waterborne vehicles, and space vehicles. Various embodiments are illustrated with reference to an unmanned aerial vehicle as an example of a type of UAV that may benefit from magnetic field navigation. A UAV may include an onboard computing device configured to operate the UAV without remote operating instructions (i.e., autonomously), such as from a human operator or remote computing device. Alternatively, the onboard computing device may be configured to maneuver and/or operate the UAV with some remote operating instruction or updates to instructions stored in a memory of the onboard computing device.

An aerial UAV may be propelled for flight using a plurality of propulsion units, each including one or more rotors, that provide propulsion and/or lifting forces for the UAV. In addition, an aerial UAV may include wheels, tank-tread, or other non-aerial movement mechanisms to enable movement on the ground. Aerial UAV propulsion units may be powered by one or more types of electric power sources, such as batteries, fuel cells, motor-generators, solar cells, or other sources of electric power, which may also power the onboard computing device, navigation components, and/or other onboard components.

The UAV may include two or more processors, a first processor that is a main or central processor or motor/flight controller of the UAV (a "main processor"), and a second processor associated with a component system of the UAV, such as a navigation system. As used herein, the term "processor" refers to one or more processors of the UAV, including the main processor and other processors of the UAV.

The term "computing device" is used herein to refer to an electronic device equipped with at least a processor that may be configured with processor-executable instructions. Examples of computing devices may include UAV flight control and/or mission management computer that are onboard the UAV, as well as remote computing devices communicating with the UAV configured to perform operations of various embodiments. Remote computing devices may include wireless communication devices (e.g., cellular telephones, wearable devices, smart-phones, web-pads, tablet computers, Internet enabled cellular telephones, Wi-Fi enabled electronic devices, personal data assistants (PDAs), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi router, etc.).

The ranges of UAVs are typically limited by their stored power supplies. While wireless charging stations may be well suited to address this limitation, current UAV navigation devices and methods (such as GPS, inertial navigation, radio navigation, and other standard systems) are not sufficiently accurate to obtain centimeter-level accuracy required to properly dock a UAV with a wireless charging station.

In some embodiments, the UAV may use a navigation system (such as GPS) to maneuver relatively close to (e.g., within a few meters) of the charging station. When close enough, the UAV may sense the magnetic field ("H-field") emanating from the charging station using a three-dimensional (3D) magnetic field sensor, and may navigate close enough to the center of the charging station based on a magnetic field vector and strength. The magnetic field sensor may include a three-loop sensor that detects an X, Y, and Z axis of the H-field. In various embodiments, a vector of the H-field may indicate the center of the charging station. The UAV may determine a maneuver direction using the H-field vector to navigate to the charging station and to position itself substantially over the center of the charging station. In some embodiments, the UAV may iteratively detect the magnetic field strength and vector, and may navigate relative to the charging station using the iteratively detected magnetic field vector and strength to position the UAV substantially over the center of the charging station.

In some embodiments, the UAV may obtain route information for a specified route for approaching the charging station. For example, certain approach routes to the charging station may be clear, while others may be obstructed. The UAV may obtain the route information from an onboard memory (e.g., routing or map information). The UAV may also obtain the route information from the charging station, from a communications network, from a user input, or from another data source. In some embodiments, the UAV may use the magnetic field strength and vector and the obtained route information to follow the specified route for approaching the charging station.

In some embodiments, upon determining that the UAV is substantially above or otherwise aligned with the center of the charging station, and/or is within a threshold distance from the charging station, the UAV may initiate a final approach sequence to close the distance to the charging station. The UAV may use the magnetic field vector and strength to control the approach sequence, adjusting the rate of approach and maintaining position over the charging station (e.g., if the UAV is moved by the wind or another factor).

In some embodiments, the UAV may magnetically couple a charging coil to the magnetic field of the charging station. In some embodiments, the UAV may power down (e.g., its motors) to facilitate charging. For example, the UAV may power down in response to detecting power being received from the charging coil. As another example, the UAV may power down in response to detecting contact with the charging station.

In various embodiments, the UAV may power up in response to determining that the power storage of the UAV is sufficiently charged. In some embodiments, the UAV may navigate away from the charging station using the magnetic field vector and strength. In some embodiments, the UAV may obtain route information for a specified route away from the charging station. In some embodiments, the UAV may use the magnetic field vector and strength, as well as the route information, to navigate away from the charging station.

Various embodiments may be implemented within a variety of UAVs, an aerial UAV 100 example of which is illustrated in FIG. 1. With reference to FIG. 1, the UAV 100 may include a plurality of rotors 120 supported by a frame 110. The rotors 120 may each be associated with a motor 125. Each motor 125 may be a three-phase alternating current (AC) motor or another multi-phase configuration of motor.

While the UAV 100 is illustrated with four rotors 120, UAVs may include more or fewer rotors 120. For conciseness of description and illustration, some detailed aspects of the UAV 100 are omitted such as wiring, frame structure interconnects or other features that would be known to one of skill in the art. For example, the UAV 100 may be constructed with an internal frame having a number of support structures or using a molded frame in which support is obtained through the molded structure.

Figure 2A:
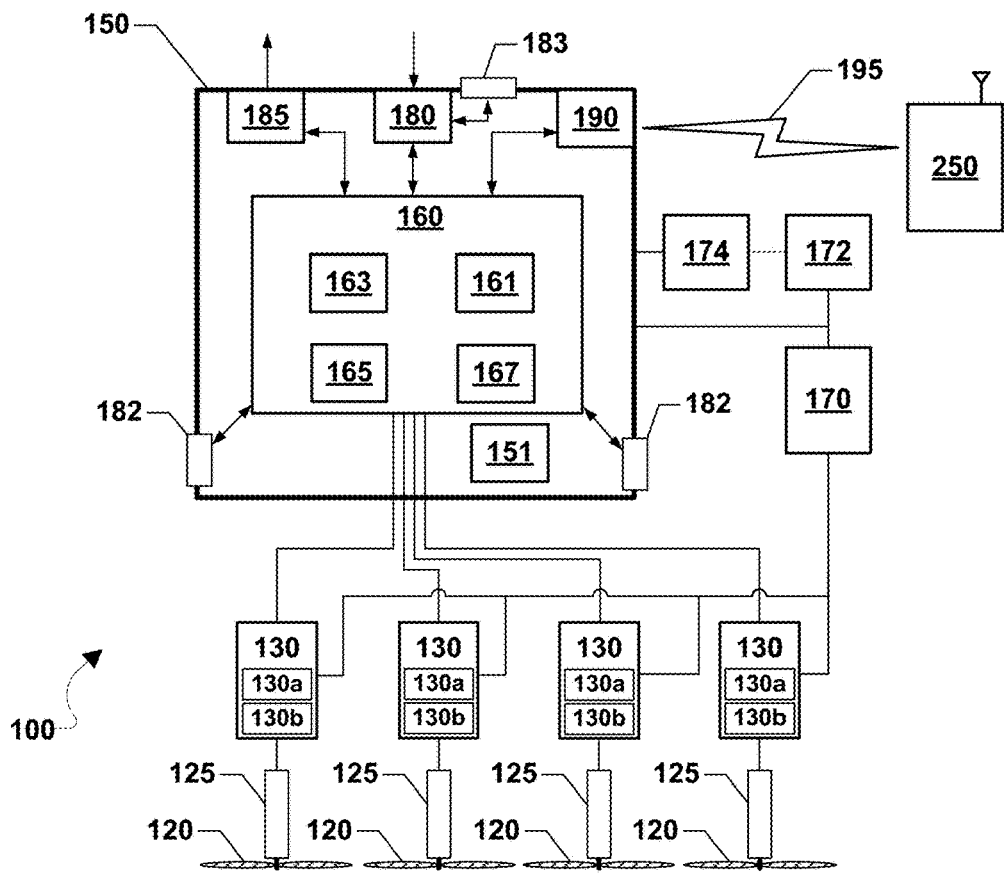
FIG. 2A is a component block diagram illustrating components of a UAV according to various embodiments.

FIG. 2A is a component block diagram illustrating components of the UAV 100 (e.g., FIG. 1) according to various embodiments. With reference to FIGS. 1 and 2A, the UAV 100 may include a control unit 150, which may include various circuits and devices used to power and control the operation of the UAV 100. For example, the control unit 150 may include a processor 160 configured with processor-executable instructions to control flight and other operations of the UAV 100, including operations of various embodiments. The control unit 150 may be coupled to each of the rotors 120 by way of the corresponding motors 125. Optionally, each of the motors 125 may communicate with a controller 130 that may handle functions including controlling aspects of the operation of its associated motor 125. Each controller 130 may include a processor 130a configured to execute processor-executable instructions that may be stored in a memory 130b.

The processor 160 or the controllers 130 may control power to the motors 125 to drive each of the rotors 120. The processor 160 or the controllers 130 may drive the motors 125 "forward" to generate varying amounts of thrust, or "backward" to produce varying amounts of mixed aerodynamic forces. Each of the controllers 130 may be used to control individual speeds of the motors 125.

The control unit 150 may include a power module 151, an input module 180, sensors 182, an output module 185, a radio module 190, or any combination thereof. The processor 160 may include or be coupled to a memory 161 and a navigation unit 163. The processor 160 may be coupled to the one or more payload-securing units 175 and the sensors 182. The payload-securing units 175 may include an actuator motor that drives a gripping and release mechanism and related controls that are responsive to the control unit 150 to grip and release a payload in response to commands from the control unit 150.

The sensors 182 may be optical sensors, radio sensors, a camera, and/or other sensors. Alternatively or additionally, the sensors 182 may be contact or pressure sensors that may provide a signal that indicates when the UAV 100 has landed. The power module 151 may include one or more batteries that may provide power to various components, including the processor 160, the payload-securing units 175, the input module 180, the sensors 182, the output module 185, and the radio module 190.

The UAV 100 may also include a power storage 170 (e.g., an onboard battery), which may be coupled to the motors 125 (e.g., via controllers 130) and the control unit 150. The power storage 170 may include energy storage components, such as rechargeable batteries. The power storage 170 may also be coupled to a charging coil 172 to enable wireless charging of the power storage 170.

Through control of individual ones of the motors 125 corresponding to each of the rotors 120, the UAV 100 may be controlled in flight as the UAV 100 progresses toward a destination and/or operates in various flight modes. The processor 160 may receive data from the navigation unit 163 and use such data in order to determine the present position and orientation of the UAV 100, as well as the appropriate course towards the destination or landing sites. In various embodiments, the navigation unit 163 may include a global navigation satellite system (GNSS) receiver system (e.g., one or more Global Positioning System (GPS) receivers) enabling the UAV 100 to navigate using GNSS signals. Alternatively or in addition, the navigation unit 163 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other UAVs, etc.

The processor 160 and/or the navigation unit 163 may be configured to communicate with a server through a wireless connection (e.g., a cellular data network) to receive commands to control flight, receive data useful in navigation, provide real-time position altitude reports, and assess data. An avionics module 167 coupled to the processor 160 and/or the navigation unit 163 may be configured to provide flight control-related information such as altitude, attitude, airspeed, heading and similar information that the navigation unit 163 may use for navigation purposes, such as dead reckoning between GNSS position updates. The avionics module 167 may include or receive data from an inertial measurement unit (IMU) 165. The IMU 165 may include one or more gyroscopes, accelerometers, and other similar devices that may provide data regarding the orientation and acceleration of the UAV 100, which may be used in navigation and positioning calculations.

The UAV 100 may also include a magnetic field sensor 174. The magnetic field sensor 174 may be configured to measure the direction and strength (vector) of a magnetic field. In some embodiments, the magnetic field sensor 174 may include three coils or loops, configured to enable the magnetic field sensor 174 to detect X, Y, and Z axis components of a magnetic field vector. The magnetic field sensor 174 may communicate with the processor 160. In some embodiments, the magnetic field sensor 174 may be coupled to the charging coil 172. In various embodiments, a processor of the UAV 100 (e.g., the processor 160) may determine a magnetic field vector and strength, and the processor 160 may use the determined magnetic field and strength to generate flight instructions to navigate the UAV 100. The processor 160 may additionally determine a position and orientation of the UAV 100 using information from one or more of the sensors 182 or one or more components of the IMU 165, and may use the position and orientation of the UAV 100 together with the determined magnetic field vector and strength to generate flight instructions for the UAV 100.

The radio module 190 may be configured to receive signals (e.g., command signals for controlling flight, signals from aviation navigation facilities, etc.) and to provide such signals to the processor 160 and/or the navigation unit 163. In some embodiments, the radio module 190 may enable the UAV 100 to communicate with a wireless communication device 250 through a wireless communication link 195. The wireless communication link 195 may be a bidirectional or unidirectional communication link, and may use one or more communication protocols (e.g., Spektrum 2.4 GHz digital spectrum modulation).

In various embodiments, the control unit 150 may be equipped with the input module 180, which may be used for a variety of applications. The input module 180 may receive images or data from an onboard camera or sensor (e.g., 182), or may receive electronic signals from other components (e.g., a payload). The output module 185 may be used to activate components (e.g., an energy cell, an actuator, an indicator, a circuit element, a sensor, and/or an energy-harvesting element).

While various components of the control unit 150 are illustrated or described as separate components, some or all of the components (e.g., the processor 160, the output module 185, the radio module 190, and other units) may be integrated together in a single device or module, such as a system-on-chip module.

Figure 2B:
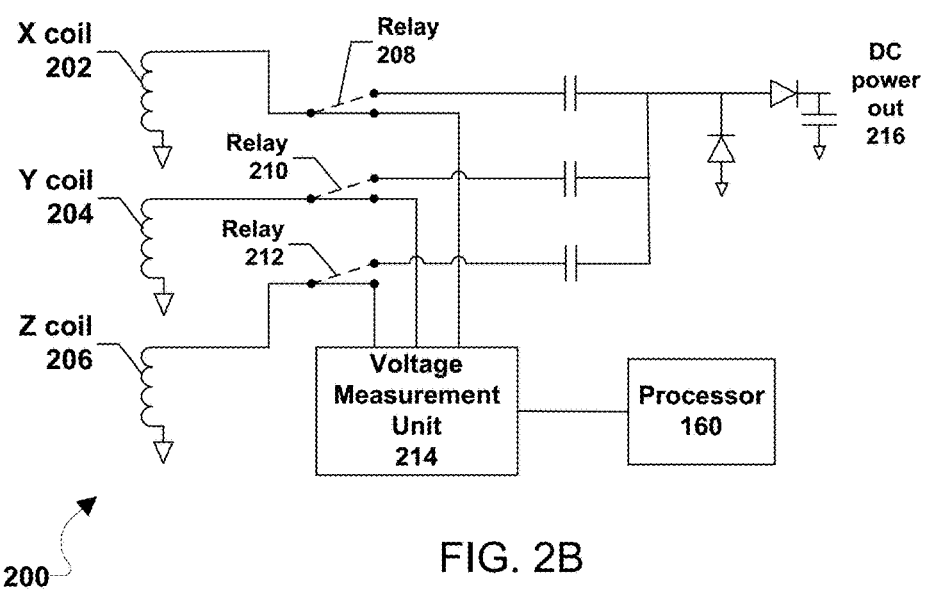
FIG. 2B is a component block diagram illustrating components of a magnetic field sensor according to various embodiments.

FIG. 2B is a component block diagram illustrating components of a magnetic sensor 200. With reference to FIGS. 1, 2A, and 2B, the magnetic sensor 200 may be similar to the magnetic sensor 174. In some embodiments, the magnetic sensor 200 may include an X coil 202, a Y coil 204, and a Z coil 206, each differently oriented to detect and measure a magnetic field in an X axis, a Y axis, and a Z axis, respectively. Each of the coils 202-206 may be coupled to a voltage measurement unit 214, which may measure a voltage generated at each coil 202-206 by a magnetic field. The voltage measurement unit 214 may communicate each of the detected voltages to the processor 160, and the processor 160 may calculate a magnetic field vector and strength based on the detected voltages.

In some embodiments, the coils 202-206 may be combined with or be a part of the charging coil 172. To enable the UAV 100 to switch from magnetic field sensing to power reception (e.g., after the UAV has landed on a charging station), the magnetic sensor 200 may include switches, such as relays 208, 210, and 212, to connect each of the coils 202-206 (respectively) to capacitors and rectifiers for DC power out (e.g., power transfer) 216.

Figure 3A:
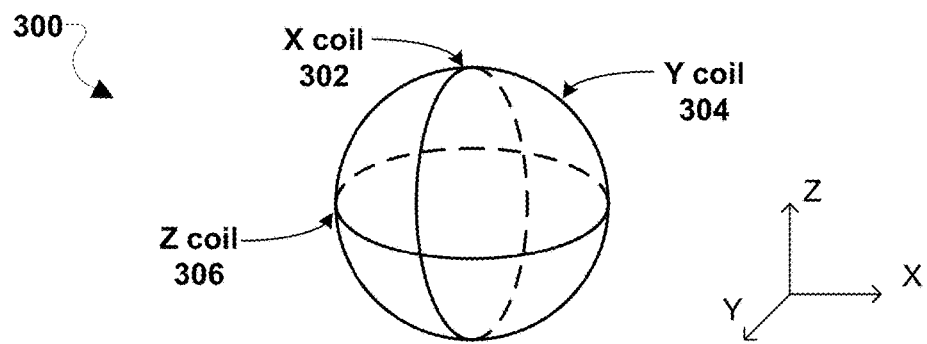
FIGS. 3A-3C are diagrams illustrating magnetic field sensors according to various embodiments.
Figure 3B:
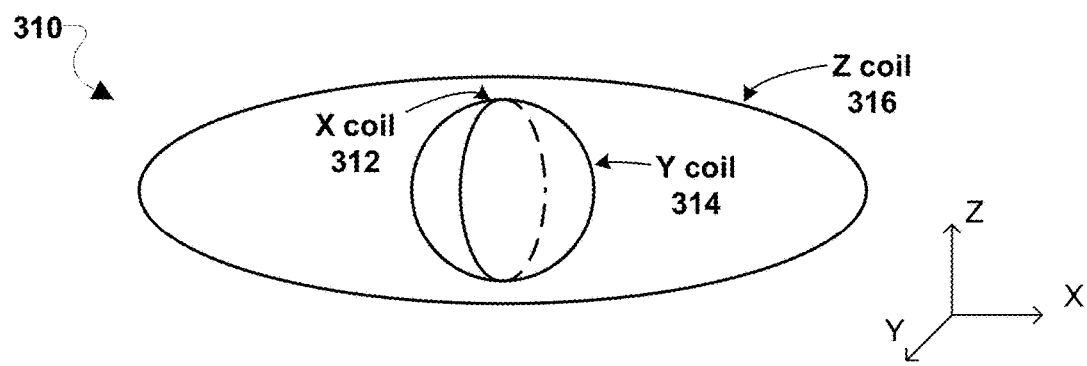
Figure 3C:
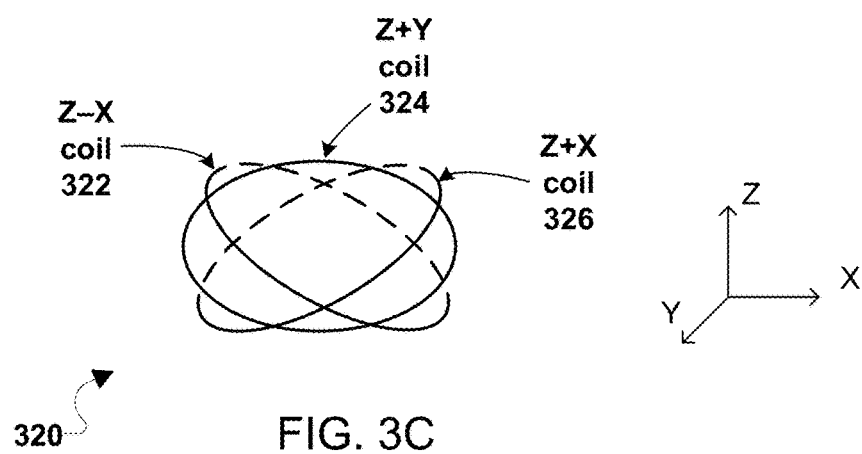

FIGS. 3A-3C illustrate magnetic field sensors 300, 310, 329 according to various embodiments. The magnetic field sensors illustrated in FIGS. 3A-3C may be similar to the magnetic field sensors 174 (FIG. 2A) and 200 (FIG. 2B).

The magnetic field sensor 300 may include three wire loop coils, an X coil 302, a Y coil 304, and a Z coil 306. The X, Y and Z coils 302-306 are oriented orthogonally to one other. Each of the X, Y and Z coils 302-306 may detect components of a magnetic field that are substantially perpendicular to the coils 302-306. A processor (e.g., 160) of the UAV may use information obtained from the coils 302-306 to determine three-dimensional information about a magnetic field.

In some embodiments, the processor may convert information from Cartesian coordinates to polar coordinates to determine an orientation of the magnetic field vector from the measurements of each coil. For example, to reduce the measurements of each coil to a vector direction, the processor may convert information from Cartesian coordinates to polar coordinates. As an example, the processor may perform a conversion using the following equations:

$$M = \sqrt{X^2 + Y^2 + Z^2} \qquad \text{[Equation 1]}$$

$$\theta = \arccos\left(\frac{Z}{M}\right) \qquad \text{[Equation 2]}$$

$$\Phi = \arctan\left(\frac{Y}{X}\right), \qquad \text{[Equation 3]}$$

in which M represents a magnitude of a magnetic field and is proportional to distance^2, and θ and Φ represent an inclination and an azimuth of the magnetic field, respectively. Taken together, M, θ, and Φ may represent a vector that points either at or away from the charging station along a unit vector defined by θ and Φ with a magnitude (strength) of M.

The three loop magnetic field sensor 310 may include an X coil 312, a Y coil 314, and a Z coil 316. In the magnetic field sensor 310, the Z coil 316 may also function as a wireless charging coil (e.g., the charging coil 172). In this configuration, the magnetic field sensor 310 may be added to a UAV by using an existing wireless charging coil and adding only two new coils (e.g., the X coil 312 and the Y coil 314). The Z coil 316 may be used to receive charging energy, for example, once the UAV has landed on the charging station.

The three loop magnetic field sensor 320 may include a Z–X coil 322, a Z+Y coil 324, and a Z+X coil 326. The magnetic field sensor 320 may be considered a "squashed" version of the magnetic field sensor 300 (FIG. 3A), in which the coils 322-326 have been "flattened" so that they lie almost entirely in the Z plane, with only a relatively small tilt into the X and Y planes. For example, in the magnetic fields a 310, the axial tilts of the coils 322-226 differ by 90 degrees. Thereby, the coil 324 receives magnetic field energy in the Z plane with a small contribution from the Y plan, and the coils 322 and 326 each receive magnetic field energy in the Z plane with a small contribution from the X field. Since the coils 322 and 326 have opposite tilts, the contribution from the X plane may be positive in the coil 326, and the contribution from the X plane may be negative in coil 322. All three coils 322-326 may also be used for power reception. As such, the addition of the magnetic field sensor 320 to a UAV may add relatively little additional weight to the UAV.

In some embodiments, the coils 322-326 may be oriented such that their axes are offset by 120 degrees. Each of the coils 322-326 may detect magnetic field flux contributions that may be represented according to the following equations:

$$\cos\theta Z + \cos\Phi Y = Z + Y \quad \text{[Equation 4]}$$

$$\cos\theta Z + \cos\Phi Y + \cos\Phi X = Z - 0.86Y + 0.5X \quad \text{[Equation 5]}$$

$$\cos\theta Z + \cos\Phi Y + \cos\Phi X = Z - 0.86Y - 0.5X \quad \text{[Equation 6]}$$

in which $\theta$ represents and angle from the Z plane, and may be close to zero degrees, and $\Phi$ represents a displacement angle from a perpendicular axis. (As used in Equations 4-6, $\theta$ and $\Phi$ do not represent the Cartesian-polar conversion represented in Equations 1-3.)

Figure 4:
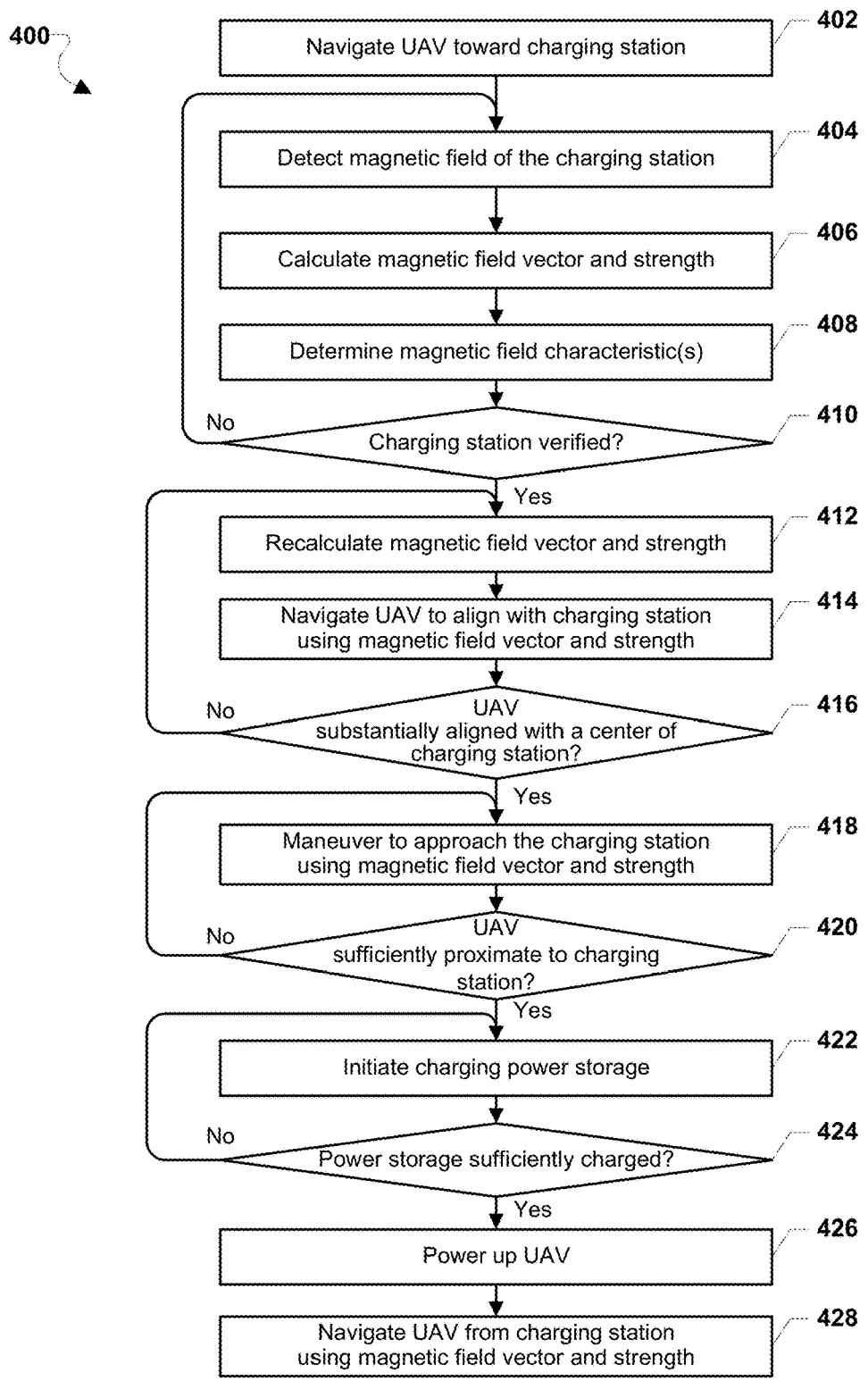
FIG. 4 is a process flow diagram illustrating a method of navigating a UAV according to various embodiments.

FIG. 4 is a process flow diagram illustrating a method 400 for navigating a UAV (e.g., 100 in FIG. 1) according to various embodiments. With reference to FIGS. 1-4, the method 300 may be implemented by a processor (e.g., the processor 160, the processor 130a, and/or the like) of the UAV.

Figure 5:
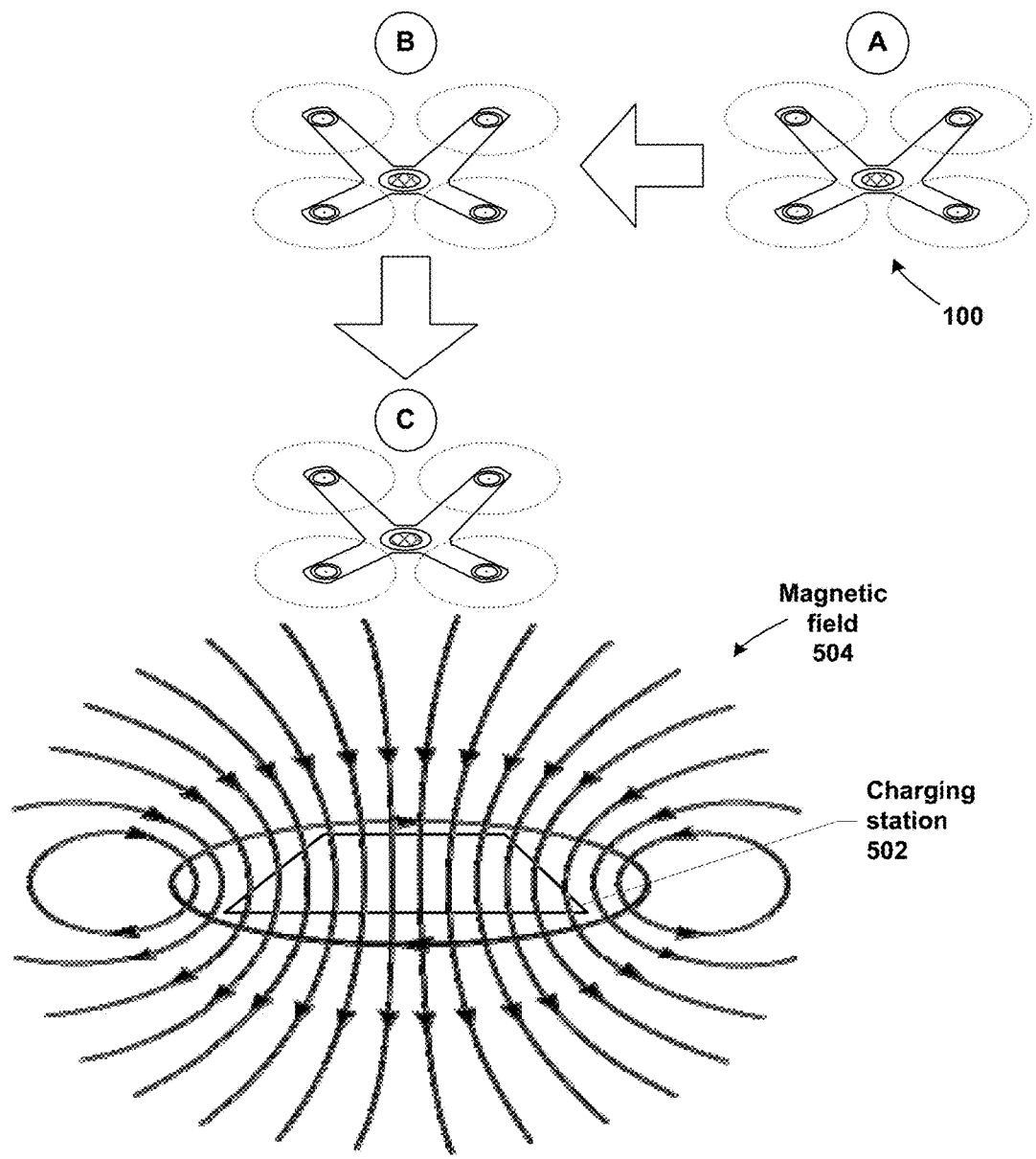
FIG. 5 is a diagram illustrating navigating of a UAV according to various embodiments.

In block 402, the processor may navigate the UAV toward a charging station. For example, the processor may determine a location of the charging station, or a relative direction to the charging station, using a navigation system such as GPS or other similar system. For example, as illustrated in FIG. 5, the processor (e.g., of the UAV 100) may approach the location of a charging station 502 using information from the navigation system.

Returning to FIGS. 1-4, in block 404, the processor may attempt to detect the magnetic field emanating from the charging station. For example, the processor may detect a magnetic field in one or more coils of a magnetic field sensor (e.g., the magnetic field sensor 174, 300, 310, 320). In some embodiments, in detecting the magnetic field of the charging station the processor may determine whether a field strength of the detected magnetic field meets a threshold field strength as would be expected to be emanating from a charging station. For example, the processor may initially detect a magnetic field 504 (FIG. 5) as it reaches position "A".

In block 406, the processor may calculate a magnetic field vector and strength. For example, the processor may use information provided by a three-dimensional magnetic field sensor to calculate the magnetic field vector and strength. In some embodiments, the processor may use the calculated magnetic field vector and strength to more accurately locate a location of and/or direction to the charging station. In some embodiments, the processor may detect a relatively weak magnetic field with diagonally-oriented field vector, which may indicate that the UAV is relatively distant from the charging station, and that the UAV is not substantially above or otherwise aligned with a center of the charging station.

In block 408, the processor may determine one or more signal characteristics of the detected magnetic field. In some embodiments, the processor may detect that the magnetic field includes an oscillation frequency, and that the oscillation frequency correlates with an expected oscillation frequency of the signal from a wireless charging station. For example, a magnetic field of a charging station may oscillate at a frequency of 6.78 MHz. In some embodiments, a magnetic field that oscillates at an expected oscillation frequency may serve as a beacon signal that is identifiable by the processor of the UAV.

In some embodiments, the magnetic field may include certain on/off characteristics. For example, a wireless charging station using the Alliance for Wireless Power (A4WP) specification for power transfer may include a beacon interval of 3 ms. Wireless charging stations using other specifications (e.g., Powermat, Qi, etc.) may also include a specific an identifiable beacon signal interval.

In some embodiments, the processor may ignore (e.g., filter out) magnetic fields that do not conform to expected signal characteristics of a charging station. Examples of magnetic fields that may be ignored in this manner include the Earth's magnetic field, the 50 or 60 Hz "hum" associated with alternating current (AC) electrical power and electrical appliances, amplitude modulated (AM) radio and other radio transmissions, and others. In some embodiments, the processor may ignore or filter out from magnetic field noise associated with spurious magnetic field signals. In some embodiments, the processor may search only for (i.e., "filter in") magnetic fields exhibiting certain specific characteristics or signals that may identify a wireless charging station (e.g., beacon signals).

In determination block 410, the processor may determine whether a charging station is detected, such as by verifying that the detected magnetic field is emanating from a recognized charging station. In some embodiments, based on the calculated magnetic field vector and strength, and the determined one or more magnetic field characteristics, the processor may verify that the detected magnetic field is emanating from a charging station. In some embodiments, the processor may determine that a charging station is detected by determining that a location of the magnetic field generally matches a known charging station location. The known charging station location may be, for example, stored in a memory of the UAV, or available to the UAV from a server or another network element of a communication network.

In response to determining that the charging station is not verified (i.e., determination block 410="No"), the processor may continue to attempt to detected the magnetic field of the charging station in block 404.

In response to verifying that the detected magnetic field is from the charging station (i.e., determination block 410="Yes"), the processor may begin navigating using the magnetic field by recalculating the magnetic field vector and strength in block 412 and navigating the UAV to approach and align with the charging station using the magnetic field vector and strength in block 414. For example, the processor may monitor the magnetic field strength and navigate the UAV in the direction of increasing field strength. As another example, the processor may monitor the magnetic field vector and navigate the UAV in the direction in which the magnetic field vector is increasingly perpendicular. In some embodiments, when navigating to a position substantially above or otherwise aligned with the center of the charging station, the processor may hold the UAV at an altitude (e.g., may hold the UAV at a position in the Z axis) and may make changes to the position of the UAV in the X and Y axes. In some embodiments, the processor may use the magnetic field strength to determine a distance of the UAV from the charging station. In some embodiments, the processor may also use information from the navigation system (e.g., GPS), which the processor may use in combination with the magnetic field strength, to determine the distance from the charging station. For example, the processor may navigate an aerial UAV toward a position "B" (FIG. 5) that is substantially above and aligned with the center of the charging station 502.

The processor may iteratively calculate the magnetic field vector and strength while navigating the UAV to detect when the UAV is lined up with the charging station, or otherwise approaching or at a position from which a final approach may begin. In determination block 416 (FIG. 4), the processor may determine whether the UAV is substantially above or otherwise aligned with a center of the charging station.

In response to determining that the UAV is not substantially above or otherwise aligned with the center of the charging station (i.e., determination block 416="No"), the processor may recalculate the magnetic field vector and strength in block 412, and may continue to navigate the UAV to align with the charging station using the magnetic field vector and strength in block 414. In some embodiments, the processor may use the detected field vector and strength to determine a distance from and/or an altitude above the charging station. For example, the magnetic field strength may be proportional to a distance between the UAV and the charging station.

In some embodiments, the magnetic field vector may indicate more than one direction. For example, a magnetic field generated by an AC current at the charging station may include two detectable field vectors, pointing and substantially opposite directions. In some embodiments, the processor may use data from one or more sensors (e.g., an accelerometer, a gyroscope, and the like) to identify which of the detectable field vectors is likely to indicate the true location of the charging station. For example, if the processor of an airborne UAV detects two field vectors, one pointing up (e.g., away from the ground) and one pointing down (e.g., toward the ground), the processor may use data from one or more sensors to determine an orientation of the UAV, or a likely location of the ground. From this information the processor may identify one magnetic field vector as indicating the direction toward the charging station, and/or to identify the other magnetic field vector as not indicating the correct direction.

In some embodiments, as the processor navigates the UAV toward the charging station, the processor may at some point switch over from using information from a navigation system (e.g., GPS) to using the magnetic field vector and strength from the charging station to navigate the UAV. For example, after the processor verifies that the detected magnetic field is associated with a charging station, the processor may switch from using the navigation system exclusively to using the magnetic field vector and strength for navigation information. In some embodiments, the processor may use both information from the navigation system and the magnetic field vector and strength to navigate the UAV. In some embodiments, the processor may use a blend or weighted combination of such information. For example, the processor may initially relying more heavily on information from the navigation system, and gradually increase a weight placed on or an amount that the processor uses the magnetic field vector and strength information for navigation as the detected magnetic field strength increases.

In response to determining that the UAV is substantially above or otherwise aligned with the center of the charging station (i.e., determination block 416="Yes"), the processor may maneuver the UAV to approach the charging station using the magnetic field vector and strength in block 418. In some embodiments, the processor may initiate an approach sequence in response to determining that the UAV is substantially above or otherwise aligned with the center of the charging station. In the case of an aerial UAV, the maneuvering the UAV to approach the charging station may involve descending while using the magnetic field vector and strength to maintain the UAV centered above the charging station. The approach sequence may also include adjusting the velocity of the UAV to enable a soft landing on or other coupling with the charging station.

For example, referring to FIG. 5, the processor may control the UAV to approach the charging station 502 from position "B" through position "C" that is substantially above or otherwise aligned with the center of the charging station 502. In some embodiments, the processor may navigate the UAV to position "B", and then the processor may control the UAV to descend to position "C" before initiating the approach sequence. For example, the processor may monitor the magnetic field strength, and may control the approach of the UAV until the magnetic field strength reaches a threshold field strength. Then, in response to determining that the magnetic field strength meets the threshold field strength, the processor may initiate the approach sequence.

In some embodiments, the processor may use some combination of information from the navigation system and the magnetic field vector and strength during the final approach to the charging station.

In some embodiments, the processor may use the magnetic field vector and strength to compensate for ambient conditions such as wind, rain, and other forces that may operate on the UAV to change its position. In some embodiments, the processor may using the magnetic field vector and strength to maintain a position of the UAV in the X and Y axes, and may decrease the position of the UAV in the Z axis.

Again returning to FIGS. 1-4, in determination block 420, the processor may determine whether the UAV is sufficiently proximate to the charging station to begin charging. In some embodiments, the processor may receive signal from, for example, a landing contact switch, a weight-on-wheel switch, and/or the like that may indicate that the UAV is in physical contact with the charging station. In some embodiments, the processor may determine whether a charging coil (e.g., the charging coil 172) is receiving energy and producing power. In some embodiments, the processor may determine whether the charging coil is receiving a threshold level of magnetic flux, for example, 40 A/m. The processor may also use combinations thereof to determine whether the UAV is sufficiently proximate to the charging station to enable charging to commence.

In response to determining that the UAV is not sufficiently proximate to the charging station (i.e., determination block 420="No"), the processor may continue to maneuver (or otherwise retry maneuvering) towards the charging station using the magnetic field vector and strength in block 418.

In response to determining that the UAV is sufficiently proximate to the charging station to commence charging (i.e., determination block 420="Yes"), the processor may initiate charging of a power storage of the UAV (e.g., the power storage 170) in block 422.

The processor may monitor the power storage level, and in determination block 424, the processor may determine whether the power storage is sufficiently charged. For example, the processor may determine whether a power storage level is greater than or equal to a threshold power storage level. In some embodiments, the processor may compare the power storage level to an amount of power required to reach a destination, or to travel a certain distance from the charging station.

In response to determining that the power storage is not sufficiently charged (i.e., determination block 424="No"), the processor may allow the power storage to continue charging in block 422.

In response to determining that the power storage is sufficiently charged (i.e., determination block 424="Yes"), the processor may navigate the UAV from the charging station, for example using the magnetic field vector and strength in block 428. In some embodiments, the processor may use the magnetic field vector and strength to obtain accurate information while departing the charging station. In some embodiments, the processor may compensate for ambient conditions (e.g., wind, rain, etc.) using the magnetic field vector and strength.

Figure 6:
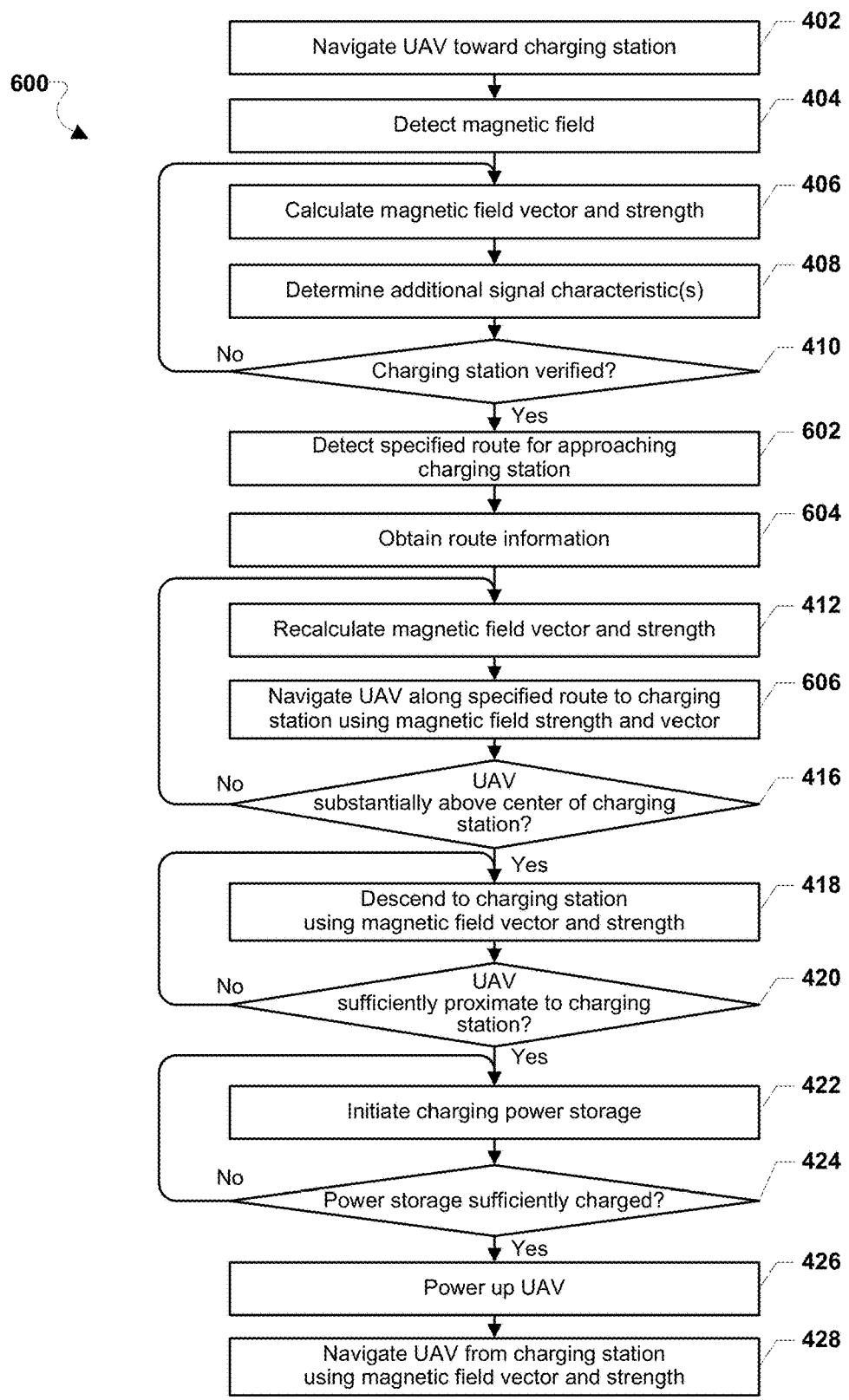
FIG. 6 is a process flow diagram illustrating a method of navigating a UAV according to various embodiments.

FIG. 6 is a process flow diagram illustrating a method 600 navigating a UAV (e.g., 100 in FIG. 1) using a magnetic field emanating from a charging station according to various embodiments. With reference to FIGS. 1-6, the method 600 may be implemented by a processor (e.g., the processor 160, the processor 130*a*, and/or the like) of the UAV. In the method 600, the processor may perform the operations in blocks 402-428 as described for like numbered blocks in the method 400.

In block 602, the processor may detect that there is a specified route for approaching the charging station. For example, certain approach routes to the charging station may be clear, while others may be obstructed, so certain charging stations may have a preferred or a required approach route. In some embodiments, the charging station may broadcast an indicator (e.g., in a beacon signal) that the UAV may receive when within range of the charging station. Such a broadcast indicator may inform the UAV of the existence of a specified route for approaching the charging station. In some embodiments, the UAV processor may be informed by a communications network that a specified route must be followed when approaching the charging station. In some embodiments, the UAV may detect the existence of the specified route based on a user input, or from another data source.

In block 604, the processor may obtain the route information. In some embodiments, the UAV may obtain the route information from the charging station, such as via signals transmitted in the magnetic field of in another wireless communication link. In some embodiments, the UAV may obtain the route information from an onboard memory (e.g., from stored routing or map information). The UAV may also obtain the route information from the charging station, from a communications network, from a user input, and/or from another data source (e.g., a remote server).

In block 606, the processor may use the magnetic field strength and vector and the obtained route information to follow the specified route for approaching the charging station. By using the magnetic field strength and vector and the obtained information to follow specified route, the processor may navigate the UAV with much greater accuracy along the specified route than by using the navigation system such as GPS to follow specified route.

Figure 7:
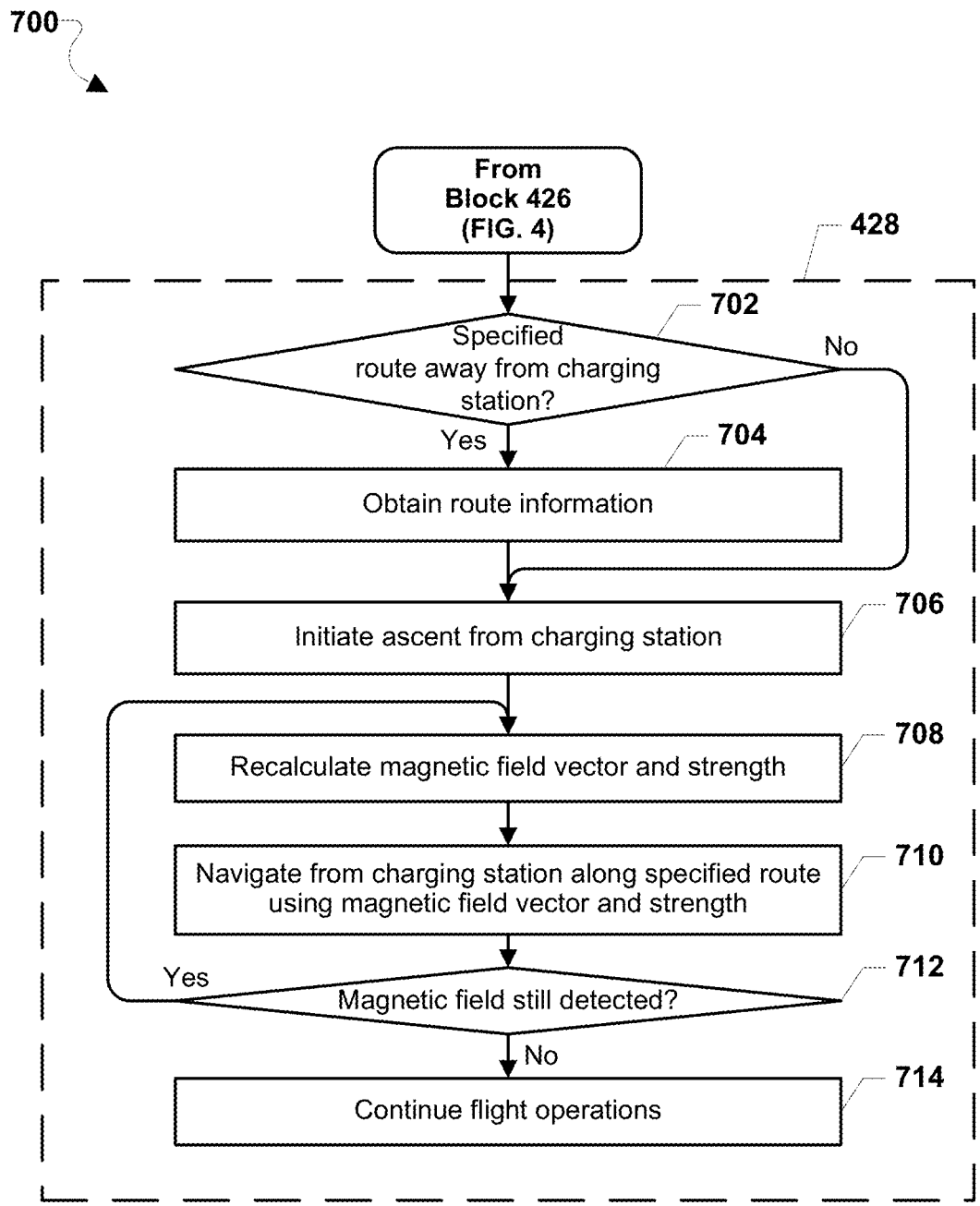
FIG. 7 is a process flow diagram illustrating a method of navigating a UAV according to various embodiments.

FIG. 7 is a process flow diagram illustrating a method 700 for navigating a UAV away from a charging station using the magnetic field strength and vector of the magnetic field emanating from the charging station according to various embodiments. With reference to FIGS. 1-7, the method 700 may be implemented by a processor (e.g., the processor 160, the processor 130*a*, and/or the like) of the UAV. The method 700 illustrates an example of operations that may be performed in block 428 of the methods 400, 600 as described.

In some embodiments, certain departure routes from the charging station may be preferred or required to avoid obstructions, other UAV traffic, and the like. For example, an aerial UAV may be required to follow a certain departure route from the charging pad to clear the edges of the roof, or to avoid known obstacles around the charging pad. As another example, a charging station may be close to a wall or window, and the UAV may need to avoid the wall or window when departing from the charging station. In such cases, the UAV may use the accurate location information provided by the magnetic field strength and vector of the magnetic field emanating from the charging station to avoid obstacles and follow the specified route away from the charging station, especially in cases where initial guidance away from the charging station is critical. For example, the processor may use the magnetic field vector and strength to maintain a position of an aerial UAV substantially directly over the center of the charging station while ascending. As another example, the processor may use the magnetic field vector and strength to follow an accurate radial path away from the charging station.

In block 702, the processor may detect that a specified route away from the charging station is required or available. In some embodiments, the charging station may transmit a message to the UAV indicating the existence of a specified route away from the charging station. In some embodiments, the charging station may transmit the message using a low power signal intended only for the UAV. The charging station may transmit the low power signal in response to determining that the UAV is receiving power from the charging station. For example, the charging station may detect that the UAV is magnetically coupled to the charging station (e.g., via the charging coil of the UAV). In some embodiments, the UAV may obtain or receive from a communications network an indicator of the existence of a specified departure route. In some embodiments, the UAV may detect the existence of the specified departure route based on a user input. Other data sources for the indicator of the specified departure route are also possible.

In block 704, the processor may obtain the departure route information. In some embodiments, the UAV may obtain the route information from an onboard memory (e.g., from stored routing or map information). The UAV may also obtain the route information from the charging station, from a communications network, from a user input, and/or from another data source.

In block 706, the processor may initiate a departure (such as an ascent) away from the charging station according to the obtained the departure route information.

In block 708, the processor may recalculate the magnetic field vector and strength, and navigate the UAV away from the charging station along the specified route using the magnetic field vector and strength in block 710. The UAV may iteratively calculate the magnetic field vector and strength while navigating the UAV away from the charging station along the specified route, as long as the processor can detect the magnetic field.

In determination block 712, the processor may determine whether the processor still detects the magnetic field.

In response to determining that the processor still detects the magnetic field (i.e., determination block 712="Yes"), the processor may continue to recalculate the magnetic field vector and strength in block 708, and navigate the UAV away from the charging station along the specified route using the magnetic field vector and strength in block 710.

In response to determining that the processor no longer detects the magnetic field (i.e., determination block 712="No"), or determining that the departure route has been completed, the processor may continue flight operations using convention navigation sources and methods (e.g., GPS) in block 714.

The various methods enable a processor of the UAV to acquire signal of a magnetic field of the charging station, and to use the magnetic field for accurate navigation of the UAV into contact with and/or away from the charging station. The various methods also enable a processor of the UAV to use the magnetic field of the charging station to enable coupling with the charging station with a high degree of navigational accuracy.

Various embodiments illustrated and described are provided merely as examples to illustrate various features of the claims. However, features shown and described with respect to any given embodiment are not necessarily limited to the associated embodiment and may be used or combined with other embodiments that are shown and described. In particular, various embodiments are not limited to use on aerial UAVs and may be implemented on any form of UAV, including land vehicles, waterborne vehicles and space vehicles in addition to aerial vehicles. Further, the claims are not intended to be limited by any one example embodiment. For example, one or more of the operations of the methods 400, 600, and 700 may be substituted for or combined with one or more operations of the methods 400, 600, and 700, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as may be used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of navigating an unmanned aerial vehicle (UAV), comprising:

calculating, by a processor of the UAV, a magnetic field vector and strength of a magnetic field emanating from a charging station detected by a magnetic field sensor of the UAV;

navigating, by the processor, the UAV to the charging station using the calculated magnetic field vector and strength;

determining, by the processor, whether the UAV is substantially aligned with a center of the magnetic field; and maneuvering, by the processor, the UAV to approach the charging station by maintaining the UAV substantially above the center of the magnetic field while descending to the charging station using the magnetic field vector and strength in response to determining that the UAV is substantially aligned with the center of the magnetic field.

2. The method of claim 1, wherein determining, by the processor, whether the UAV is substantially aligned with a center of the magnetic field comprises determining, by the processor, whether the UAV is substantially aligned with a center of the charging station.

3. The method of claim 2, further comprising:
recalculating, by the processor, the magnetic field vector and strength in response to determining that the UAV is not substantially aligned with the center of the charging station; and
maneuvering, by the processor, the UAV to approach the charging station using the recalculated magnetic field vector and strength.

4. The method of claim 1, wherein maneuvering, by the processor, the UAV to approach the charging station by maintaining the UAV substantially above the center of the magnetic field while descending to the charging station using the magnetic field vector and strength comprises:
descending, by the processor, the UAV to the charging station while maintaining the UAV substantially above a center of the charging station using the magnetic field vector and strength.

5. The method of claim 1, further comprising:
determining, by the processor, whether the UAV is sufficiently proximate to the charging station; and
initiating, by the processor, charging of a power storage of the UAV in response to determining that the UAV is sufficiently proximate to the charging station.

6. The method of claim 1, further comprising:
detecting, by the processor, the magnetic field;
detecting, by the processor, one or more characteristics of the detected magnetic field; and
verifying, by the processor, that the charging station is generating the magnetic field based on the detected one or more characteristics.

7. The method of claim 1, wherein navigating, by the processor, the UAV to the charging station using the calculated magnetic field vector and strength comprises:
obtaining, by the processor, route information defining a specified route for approaching the charging station; and
navigating, by the processor, the UAV along the specified route using the route information and the calculated magnetic field vector and strength.

8. The method of claim 1, further comprising:
navigating, by the processor, the UAV away from the charging station using the magnetic field vector and strength.

9. The method of claim 8, wherein navigating, by the processor, the UAV away from the charging station using the magnetic field vector and strength comprises:
obtaining, by the processor, route information for a specified route away from the charging station; and
navigating, by the processor, the UAV along the specified route away from the charging station using the route information and the calculated magnetic field vector and strength.

10. The method of claim 1, wherein calculating, by the processor of the UAV, the magnetic field vector and strength of the magnetic field emanating from the charging station comprises:
receiving, by the processor, information from the magnetic field sensor, wherein the magnetic field sensor comprises a first coil, a second coil, and a third coil, wherein each coil is oriented orthogonally to the other two coils; and
calculating, by the processor, the magnetic field vector based on the information received from the first coil, the second coil, and the third coil.

11. The method of claim 1, wherein calculating, by the processor of the UAV, the magnetic field vector and strength of the magnetic field emanating from the charging station comprises:
receiving, by the processor, information from the magnetic field sensor, wherein the magnetic field sensor comprises a first coil, a second coil, and a third coil, wherein at least one of the first coil, the second coil, and the third coil comprises a charging coil of the UAV; and
calculating, by the processor, the magnetic field vector based on the information received from the first coil, the second coil, and the third coil.

12. The method of claim 1, wherein calculating, by the processor of the UAV, the magnetic field vector and strength of the magnetic field emanating from the charging station comprises:
receiving, by the processor, information from the magnetic field sensor, wherein the magnetic field sensor comprises a first coil, a second coil, and a third coil, wherein the first coil, the second coil, and the third coil are oriented substantially in the same plane and wherein each coil is oriented to detect a first magnetic field component of a first plane and a second magnetic field component of one of a second plane and a third plane; and
calculating, by the processor, the magnetic field vector based on the information received from the first coil, the second coil, and the third coil.

13. An unmanned aerial vehicle (UAV), comprising:
a magnetic field sensor; and
a processor coupled to the magnetic field sensor and configured with processor-executable instructions to:
calculate a magnetic field vector and strength of a magnetic field emanating from a charging station;
navigate the UAV to the charging station using the calculated magnetic field vector and strength;
determine whether the UAV is substantially aligned with a center of the magnetic field; and
maneuver the UAV to approach the charging station by maintaining the UAV substantially above the center of the magnetic field while descending to the charging station using the magnetic field vector and strength in response to determining that the UAV is substantially aligned with the center of the magnetic field.

14. The UAV of claim 13, wherein the processor is further configured with processor-executable instructions to determine whether the UAV is substantially aligned with a center of the charging station.

15. The UAV of claim 14, wherein the processor is further configured with processor-executable instructions to:
recalculate the magnetic field vector and strength in response to determining that the UAV is not substantially aligned with the center of the charging station; and
maneuver the UAV to approach the charging station using the recalculated magnetic field vector and strength.

16. The UAV of claim 13, wherein the processor is further configured with processor-executable instructions to maneuver the UAV to approach the charging station by maintaining the UAV substantially above the center of the magnetic field while descending to the charging station using the magnetic field vector and strength by descending the UAV to the charging station while maintaining the UAV substantially above a center of the charging station using the magnetic field vector and strength.

17. The UAV of claim 13, wherein the processor is further configured with processor-executable instructions to:
   determine whether the UAV is sufficiently proximate to the charging station; and
   initiate charging of a power storage of the UAV in response to determining that the UAV is sufficiently proximate to the charging station.

18. The UAV of claim 13, wherein the processor is further configured with processor-executable instructions to:
   detect the magnetic field;
   detect one or more characteristics of the detected magnetic field; and
   verify that the charging station is generating the magnetic field based on the detected one or more characteristics.

19. The UAV of claim 13, wherein the processor is further configured with processor-executable instructions to navigate the UAV to the charging station using the calculated magnetic field vector and strength by:
   obtaining route information defining a specified route for approaching the charging station; and
   navigating the UAV along the specified route using the route information and the calculated magnetic field vector and strength.

20. The UAV of claim 13, wherein the processor is further configured with processor-executable instructions to:
   navigate the UAV away from the charging station using the magnetic field vector and strength.

21. The UAV of claim 20, wherein the processor is further configured with processor-executable instructions to navigate the UAV away from the charging station using the magnetic field vector and strength by:
   obtaining route information for a specified route away from the charging station; and
   navigating the UAV along the specified route away from the charging station using the route information and the calculated magnetic field vector and strength.

22. The UAV of claim 13, wherein the processor is further configured with processor-executable instructions to calculate the magnetic field vector and strength of the magnetic field emanating from the charging station by:
   receiving information from the magnetic field sensor, the magnetic field sensor comprising a first coil, a second coil, and a third coil, wherein each coil is oriented orthogonally to the other two coils; and
   calculating the magnetic field vector based on the information received from the first coil, the second coil, and the third coil.

23. The UAV of claim 13, wherein the processor is further configured with processor-executable instructions to calculate the magnetic field vector and strength of the magnetic field emanating from the charging station by:
   receiving information from the magnetic field sensor, the magnetic field sensor comprising a first coil, a second coil, and a third coil, wherein at least one of the first coil, the second coil, and the third coil comprises a charging coil of the UAV; and
   calculating the magnetic field vector based on the information received from the first coil, the second coil, and the third coil.

24. The UAV of claim 13, wherein the processor is further configured with processor-executable instructions to calculate the magnetic field vector and strength of the magnetic field emanating from the charging station by:
   receiving information from the magnetic field sensor, the magnetic field sensor comprising a first coil, a second coil, and a third coil, wherein the first coil, the second coil, and the third coil are oriented substantially in the same plane and wherein each coil is oriented to detect a first magnetic field component of a first plane and a second magnetic field component of one of a second plane and a third plane; and
   calculating the magnetic field vector based on the information received from the first coil, the second coil, and the third coil.

25. An unmanned aerial vehicle (UAV), comprising:
   means for calculating a magnetic field vector and strength of a magnetic field emanating from a charging station;
   means for navigating the UAV to the charging station using the calculated magnetic field vector and strength;
   means for determining whether the UAV is substantially aligned with a center of the magnetic field; and
   means for maneuvering the UAV to approach the charging station by maintaining the UAV substantially above the center of the magnetic field while descending to the charging station using the magnetic field vector and strength in response to determining that the UAV is substantially aligned with the center of the magnetic field.

26. A non-transitory processor-readable medium having stored thereon processor-executable instructions configured to cause a processor of an unmanned aerial vehicle (UAV) to perform operations comprising:
   calculating a magnetic field vector and strength of a magnetic field emanating from a charging station;
   navigating the UAV to the charging station using the calculated magnetic field vector and strength;
   determining whether the UAV is substantially aligned with a center of the magnetic field; and
   maneuvering the UAV to approach the charging station by maintaining the UAV substantially above the center of the magnetic field while descending to the charging station using the magnetic field vector and strength in response to determining that the UAV is substantially aligned with the center of the magnetic field.

27. The non-transitory processor-readable medium of claim 26, wherein the stored processor-executable instructions are configured to cause the processor of the UAV to perform operations further comprising:
   recalculating the magnetic field vector and strength in response to determining that the UAV is not substantially aligned with a center of the magnetic field; and
   maneuvering the UAV to approach the charging station using the recalculated magnetic field vector and strength.

28. The non-transitory processor-readable medium of claim 26, wherein the stored processor-executable instructions are configured to cause the processor of the UAV to perform operations further comprising:
   detecting the magnetic field;
   detecting one or more characteristics of the detected magnetic field; and
   verifying that the charging station is generating the magnetic field based on the detected one or more characteristics.

* * * * *